(12) United States Patent
Haberstroh

(10) Patent No.: US 11,055,367 B2
(45) Date of Patent: Jul. 6, 2021

(54) WEB APPLICATION ARCHITECTURE FOR INFORMATION MANAGEMENT

(71) Applicant: SAP SE, Walldorf (DE)

(72) Inventor: Philippe Haberstroh, Paris (FR)

(73) Assignee: SAP SE, Walldorf (DE)

(*) Notice: Subject to any disclaimer, the term of this patent is extended or adjusted under 35 U.S.C. 154(b) by 300 days.

(21) Appl. No.: 16/190,666

(22) Filed: Nov. 14, 2018

(65) Prior Publication Data

US 2020/0151279 A1    May 14, 2020

(51) Int. Cl.
*G06F 16/00*    (2019.01)
*G06F 16/951*    (2019.01)
*G06F 16/2455*    (2019.01)
*H04L 29/08*    (2006.01)

(52) U.S. Cl.
CPC ...... *G06F 16/951* (2019.01); *G06F 16/24564* (2019.01); *H04L 67/02* (2013.01)

(58) Field of Classification Search
CPC .... G06F 16/951; G06F 16/24564; G06F 8/24; G06F 8/35; G06F 8/38; G06F 16/958; H04L 51/04; H04L 67/02
See application file for complete search history.

(56) References Cited

U.S. PATENT DOCUMENTS

| | | | | |
|---|---|---|---|---|
| 10,503,494 B1* | 12/2019 | Robinson | ............... | G06F 8/70 |
| 2001/0051961 A1* | 12/2001 | Duxbury | ............... | G06F 16/958 |
| | | | | 715/243 |
| 2004/0167989 A1* | 8/2004 | Kline | ............... | G06F 16/958 |
| | | | | 709/245 |
| 2005/0273705 A1* | 12/2005 | McCain | ............... | G06F 16/958 |
| | | | | 715/234 |
| 2013/0198603 A1* | 8/2013 | Gokhman | ............... | G06F 16/958 |
| | | | | 715/234 |
| 2013/0219263 A1* | 8/2013 | Abrahami | ............... | G06F 40/103 |
| | | | | 715/234 |
| 2014/0068419 A1* | 3/2014 | Bourke | ............... | G06F 40/14 |
| | | | | 715/235 |
| 2015/0234796 A1* | 8/2015 | Williams | ............... | G06F 40/186 |
| | | | | 715/229 |
| 2016/0359689 A1* | 12/2016 | Herreria | ............... | H04L 67/10 |
| 2019/0384616 A1* | 12/2019 | Govindaraj | ............... | G06F 8/38 |

* cited by examiner

*Primary Examiner* — Alexander Khong

(74) *Attorney, Agent, or Firm* — Schwegman Lundberg & Woessner, P.A.

(57) ABSTRACT

Various examples are directed to systems and methods for implementing a web-based information system. A web application system may access a web application document that comprises object data, user interface data, and rule data. The web application system may serve the first user interface page to a first instance of a web application executing at a first user computing device, the first user interface page including first data object attributes of the first data object. The web application system may receive, through the first user interface page, a change to the first data object. The web application system may determine that the rule data describes a first action to be executed in response to the change to the first data object and execute the first action.

20 Claims, 15 Drawing Sheets

| TAB A | TAB B | |
|---|---|---|
| ROW | ID | DESCRIPTION | STATUS | CONTACT |

| ROW | ID | DESCRIPTION | STATUS | CONTACT |
|---|---|---|---|---|
| 1 | 123 | 486 LOREM | NEW | ID12304 |
| 2 | 456 | 482 IPSUM | AWAITING ASSIGNMENT | ID56081 |
| 3 | 490 | 892 DOLOR | AWAITING ASSIGNMENT | ID05689 |
| 4 | 647 | 967 SIT | CLOSED | ID78678 |
| ⋮ | | | | |
| N | 457 | 960 AMET | IN PROCESS | ID78678 |

*FIG. 9*

WEB APPLICATION ARCHITECTURE FOR INFORMATION MANAGEMENT

TECHNICAL FIELD

This document generally relates to methods and systems for use with computer devices, including networked computing devices. More particularly, this document relates to systems and methods for a configurable web application architecture.

BACKGROUND

Many types of activities involve the management of information. For example, a business activity related to software compliance monitoring can include managing various different software licenses, e-mails and other communications about software licenses, lists of installations, etc. Consider another business activity related to a collaboration between companies. Managing such a collaboration can include managing various contracts, communications, reports, etc. Computer technology, including database technology, e-mail and other messaging technology, etc., has been used to facilitate information management for business activities.

BRIEF DESCRIPTION OF DRAWINGS

The present disclosure is illustrated by way of example and not limitation in the following figures.

FIG. 9 is a diagram showing one example of a UI page described by a web application document that may be served to a web application instance.

DETAILED DESCRIPTION

Figure 1:
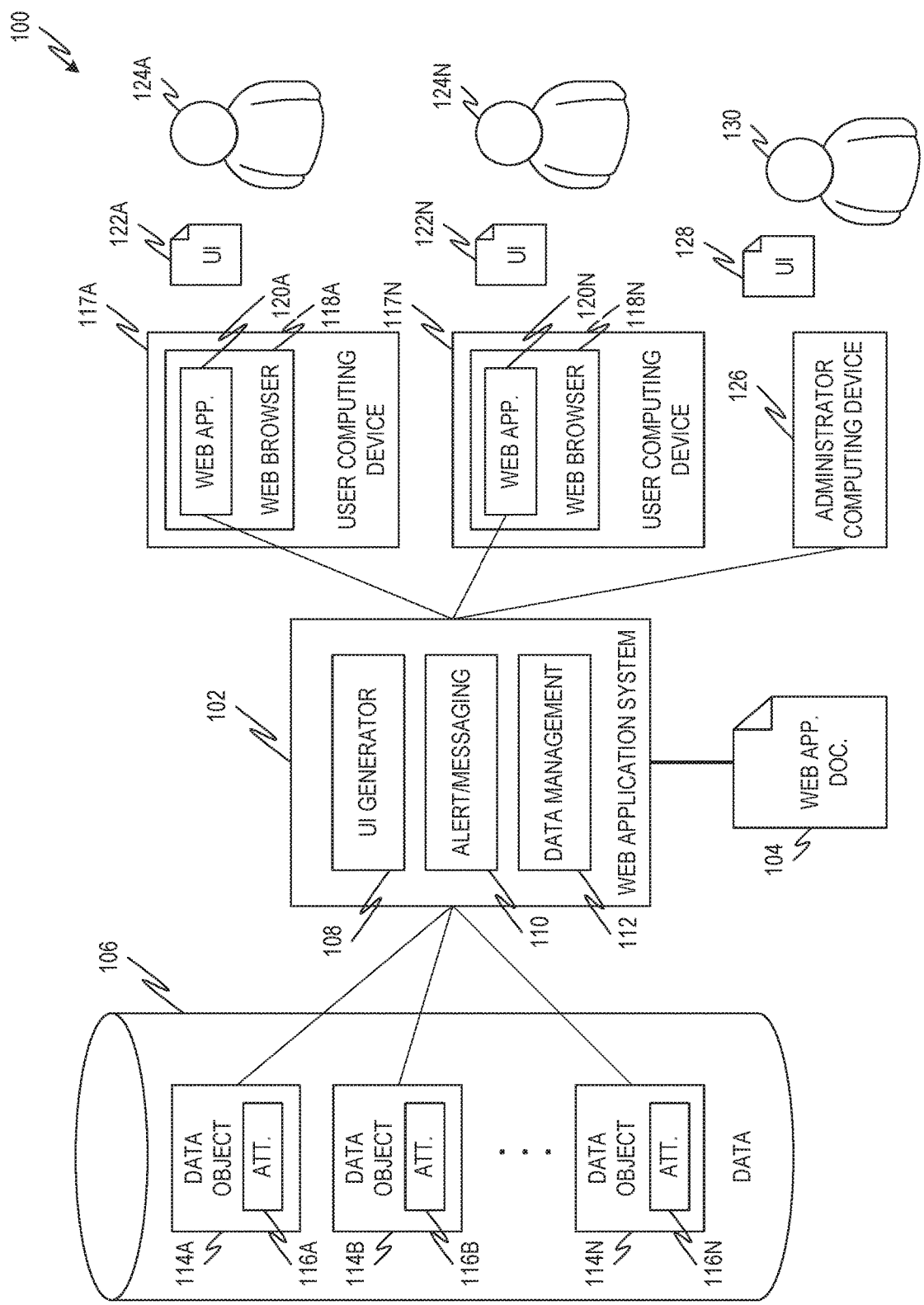
FIG. 1 is a diagram showing one example of an environment for implementing a web-based information management system.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Computer technology, including database technology and various messaging technologies, such as e-mail, can be used to manage information for various types of business activities. For large-scale business activities, it can be cost effective to develop custom software solutions for managing information. Custom solutions can be configured to store, retrieve, modify, and act on computer-stored data objects according to the needs of the users. Custom solutions, however, can be cost prohibitive for small and medium scale business activities and/or business activities with limited profitability. Despite this, small and medium scale business activities can still have considerable information management needs. For example, a simple software compliance project may monitor scores of software products over hundreds of installations at hundreds of computing devices, along with attendant information about installation activities, uninstall activities, messages regarding the same, etc.

Various examples described herein address these and other challenges by providing a web-based information system to support a web application based on a web application document. The web application document includes object data describing data objects that may be stored at a database or other data storage. The web application document can also include user interface (UI) data describing one or more UI pages that can be provided through the web application to allow the user to view and/or modify data objects. Additionally, the web application document can include rule data. The rule data describes one or more actions to be performed by a web application system in response to various activities, such as changes to data objects, receipt of e-mail or other messages, etc.

A web application system is programmed to provide a web application to one or more user computing devices based on the web application document. For example, the web application system can include a UI generator subsystem that reads user interface data from the web application document and provides corresponding UI pages to web applications executing at one or more user computing devices. An alert/messaging subsystem of the web application system is programmed to read rule data from the web application document and execute alerts and/or messaging called for by the rules data. A data management subsystem of the web application system is configured to respond to data object queries received through web applications executing at user computing devices and, in some examples, to read and/or modify data objects in a manner called for by rules data.

The web application document can be formatted in a markup language, such as Extensible Markup Language (XML), Hypertext Markup Language (HTML), or another format that is both human-readable and machine-readable. Data in a machine-readable format can be processed by a computer, for example, without the need for natural language processing before the data can be used by the computer. Examples of data in machine-readable formats include object code, source code that can be compiled to generate object code, source code that can be interpreted to generate object code, and markup language. Data in a human-readable format is understandable to a human, for example, without specialized technical training. Examples of data in human-readable formats include natural language and markup language, such as XML and HTML.

Markup languages, such as XML and HTML, utilize text-based tags to label and structure data. Markup languages are machine-readable, for example, because a computer can parse the text-based tags to discern the meaning and structure of the data. Markup languages are also human-readable because the textual nature of the tags can allow a human user to understand the markup language, often without specialized technical training.

The web application document can be developed from a web application document template, also referred to herein as a template. The template can include template object data, template user interface data, and/or template rule date. An administrative user can modify the template to generate the web application document. For example, the administrative user can replace or modify template object data with similarly-formatted object data describing data objects that are, for example, relevant to a particular business activity. Similarly, the administrative user can replace or modify template user interface data with similarly-formatted user interface data describing UI pages that are relevant to the particular business activity. Also, the administrative user can replace or modify template rule data with similarly-formatted rule data to implement rules that are relevant to the particular business activity.

The architecture described herein including the web application document and the web application system provides improvements to computer technology due to superior configurability and cost effectiveness. For example, instead of requiring that a custom web application be coded from scratch, the system and methods described herein can allow a custom information management web application to be created by modifying and/or supplementing the web application document template. This, for example, can provide the benefits of a custom web application with greatly reduced development costs. As a result, the benefits of custom information management manage can be enjoyed even for business activities that would not justify the cost of custom-coded solutions.

FIG. 1 is a diagram showing one example of an environment 100 for implementing a web-based information management system. The environment 100 includes a web application system 102 in communication with a database 106, an administrator computing device 126 and various user computing devices 117A, 117N. The web application system 102 supports web application instances 120A, 120N executing at the user computing devices 116A, 116B in accordance with a web application document 104, as described herein.

The web application system 102 provides an interface between the web application instances 120A, 120N and a database 106 include various data objects 114A, 114B, 114N. The database 106 can be any suitable type of database including, for example, an in-memory database described in more detail here. Data objects 114A, 114B, 114N can be any suitable type of data object including, for example, word processing documents, spreadsheets, electronic messages, such as e-mails, electronic calendars, etc.

In addition to the data objects 114A, 114B, 114N themselves, the database 106 can store respective attributes 116A, 116B, 116N of the data objects 114A, 114B, 114N. The attributes 116A, 116B, 116N describe properties of the data objects 114A, 114B, 114N including, for example, when the data objects 114A, 114B, 114N were created or modified, by whom the data objects 114A, 114B, 114N were created or modified, etc. In some examples, a data object 114A, 114B, 114N is or includes a record stored at a database table. Attributes 116A, 116B, 116N of a data object 114A, 114B, 114N can be stored at fields of the corresponding record. Data objects 114A, 114B, 114N and/or attributes 116A, 116B, 116N may be generated, deleted, and/or modified via the web application instances 120A, 120N as described herein.

The web application system 102 interfaces between the web application instances 120A, 120N and the database 106 according to the web application document 104. The web application document 104 can be in a format that is computer-readable and human-readable. For example, the web application document can be formatted according to a markup language, such as XML or HTML. The web application document 104 can be stored at the database 106 and/or at another data storage location that is accessible to the web application system 102.

The web application document 104 includes instructions for interfacing the web application instances 120A, 120N to the data objects 114A, 114B, 114N at the database 106. For example, the web application document 104 can include object data. Object data describes various data objects 114A, 114B, 114N at the database 106 that can be managed by the web application system 102. For example, the object data can describe objects 114A, 114B, 114N as well as attributes 116A, 116B, 116N that describe different data objects 114A, 114B 114N. In some examples, object data at the web application document 104 includes attribute description data that describes the meaning of a particular attributes 116A, 116B, 116N. Also, in some examples, object data at the web application document 104 describes allowable values for an attribute. For example, an attribute describing whether a particular report is complete can have an allowable value of "yes" or "no."

In examples in which the web application document is formatted in a markup language, markup tags can be used to specify data objects, data object attributes, and descriptions thereof. Consider the example XML code below:

```
<object title="Document" alias="LEX_DOCUMENT" y="300" x="450">
  <attrs>
    <attr title="ID" alias="LEX_DOCUMENT_ID" db-type="number-
       integer" ui-type="text"/>
    <attr title="Linked Object" alias="OBJECT_ID" db
       type="number-integer" ui-type="text"/>
    <attr title="Title" alias="LEX_DOCUMENT_TITLE" db-
```

-continued

```
        type="varchar" ui-type="text"/>
    <attr title="Path" alias="LEX_DOCUMENT_PATH" db-
        type="varchar" ui-type="text"/>
    <attr title=" Type" alias="LEX_DOCUMENT_TYPE" db-
        type="varchar" ui-type="text"/>
    <attr title="Created On" alias="CREATED_ON" db-
        type="date" ui-type="text"/>
    <attr title="Created By" alias="CREATED_BY" db-
        type="varchar" ui-type="text"/>
    <attr title="Changed On" alias="CHANGED_ON" db-
        type="date" ui-type="text"/>
    <attr title="Changed By" alias="CHANGED_BY" db-
        type="varchar" ui-type="text"/>
    </attrs>
</object>
```

The example above utilizes markup tags "<object title>" and "</object>" to delineate the data describing the example object called "Document." Markup tags "<attr title>" and "<attrs>" are used to title and define object attributes.

The web application document 104 may also include user interface data. User interface data describes one or more UI pages that can be provided to the web application instances 120A, 120N. The user interface data can tie one or more particular data objects to presentation on a UI page. User interface data describing a UI page can indicate one or more page UI elements including, for example, a position of the page element on the page. Page elements can include, for example, panels, buttons, toolbars, tiles, fields, tabs, etc.

The web application document 104 can describe the position of various elements on a UI page as well as the size, shape, and appearance of them UI elements. The web application document 104 can also describe actions that can be taken in response to user interaction with UI elements. For example, a button element can have an associated action, indicated by the web application document 104, that is taken by the web application system 102 when the button is selected. In some examples, one UI element can be a sub-unit of another UI element. For example, a tab element can be associated with one or more other elements, such as panels, toolbars, tiles, fields, etc., that are displayed when the tab is selected.

The example XML code segment below describes a UI page including a toolbar element with a number of button elements included in the toolbar. Each button element has an associated icon, indicated by the tag "sap-icon" and an associated action, indicated by the tag "onclick."

```
<screen title="Navigation" alias="main" type="main" y="50"
x="50" url="/URL/EXAMPLE" descr="Container and navigation
toolbar" system="true">
    <toolbar alias="main_toolbar" help-
    action="window.open( 'mailto:EXAMPLE@exchange.sap.corp');">
        <button title="Labels" separator=" true"
            onclick="$( '.icon-label').toggle( );" sap-icon="E169"/>
        <button title="Back" separator="true"
            onclick="if(g_previousFrameId) {
            showFrame(g_previousFrameId) ; }" sap-icon="E1EE"/>
        <button title=" Home" separator=" true"
            onclick="showFrame( 'home')" sap-icon="E070"/>
        <button title="Reload" separator=" true"
            onclick="reloadFrame( )" sap-icon="E00A"/>
        <button title="Project"
            onclick="showFrame( 'list', 'main_list.asp?alias=project ' )
        " sap-icon="E0BB"/>
        <!--<button sap-icon="E1F3" onclick="frameSplit( )"
            title="Split"/><button sap-icon="E04A"
            onclick="showFrame( 'list', 'main_list.asp?alias=document ' )
        " title="Docs"/> -->
        <button title="New" separator=" true"
            onclick="showFrame( 'edit', 'main_edit.asp?alias=project_e
            dit&id=-1 ' )" sap-icon="E172"/><button title="Admin"
            separator=" true"
            onclick="window.open( 'admin/admin.asp?app=due_diligence' )
        " sap-icon="E0A6" auth-role="DUE_DILIGENCE:ADMIN"/>
    </toolbar>
</screen>
```

The web application document 104 can also include rules data. Rules data describes rules for the web application instances 120A, 120N and web application system. One example type of rule specifies an action to be taken by a web instance 120A. 120N and/or web application system 102 in response to a certain condition. On example, rule can include sending an e-mail or other electronic message in response to an update to a data object. Another example rule specifies that a particular data object or attribute will take a specified value in response to another data object or attribute having corresponding value.

Example XML code that may be included in the web application document 104 to define a rule is provided below:

```
<rule title="To be approved" alias="EM05">
    <trigger type="db-update" object=" PROJECT"
        attr="MAIN_STATUS" to="TO-BE-APPROVED"/>
    <action type="email" to="@recipient"
        template=" to_be_approved"
        from="compliance.dds@sap.com">
    </action>
</rule>
```

In this example, the rule is triggered when the database 106 is updated in a way that modifies a data object 114A, 114B, 114N called "Project" to a main status value "To-Be-Approved." Upon occurrence of this action, the rule instructs the web application system 102 (e.g., the alert/messaging subsystem 110) to send an e-mail to an indicated recipient.

The web application system 102 can include the UI generator subsystem 108, alert/messaging subsystem 110, and the data management subsystem 112. The subsystems 108 support web application instances 120A, 120N in accordance with the web application document 104. The UI generator subsystem 108 serves UI pages described by the web application document 104 to the web application instances 120A, 120N. The UI pages are displayed, for example, at displays of the user computing devices 117A, 117N.

The alert/messaging subsystem 110 sends electronic alerts and/or messages. For example, the alert/messaging subsystem 110 can send e-mails, short message service (SMS) messages, or other electronic messages to one or more users 124A, 124N in response to conditions indicated by rule data of the web application document 104.

The data management system 112 manages data objects 114A, 114B. 114N and/or attributes 116A, 116B, 116N at the database 106. For example, the data management system 112 can query the database 106 to retrieve and/or modify data objects 114A, 114B, 114N or attributes 116A, 16B, 116N thereof as indicated by rule data and/or by a user 124A, 124N via a UI page.

Web application instances 120A. 120N can execute at user computing devices 117A, 117N of respective users 124A, 124N. The user computing devices 117A, 117N may execute the web application instances 120A, 120N in respective web browsers 118A, 118N also executing at the user computing devices 117A, 117N. Web browsers 118A, 118N may include an interpreter engine, such as a JavaScript engine or other suitable interpreter engines. The interpreter engine receives and executes interpreted code, such as web application code for executing the web application instances 120A, 120N.

In some examples, users 124A. 124N of the user computing devices 117A, 117N access the web application instances 120A, 120N by launching the web browsers 118A, 118N and selecting a Universal Resource Locator (URL) or other address associated with the web application system 102. The web browsers 118A, 118N may send to the web application system 102 a request for the web application instances 120A, 120N and receive, in reply, web application code for executing the web application instances 120A, 120N. The web application code may be in any suitable form. In some examples, the web application code is in an interpreted language, such as Hypertext Transfer Protocol (HTTP), JavaScript, etc. In some examples, the web application code includes or is accompanied by other content such as text content, media content, etc., that may be provided as part of a UI provided by the web application instances 120A, 120N through the web browsers 118A, 118N.

The web browsers 118A, 118N execute the web application instances 120A, 120N, for example, utilizing interpreter engines. Executing the web applications instances 120A, 120N can include providing respective UIs 122A. 122N to the users 124A 124N. UIs 122A, 122N can include UI pages served to the web application instances 120A, 120N as described herein.

FIG. 1 also shows an example administrator computer device 126 that provides a UI 128 to an administrator user 130. In various examples, the administrator user 130 configures and/or modifies the web application document 104 via the administrator computing device 126 and/or UI 128. For example, the UI 128 may display a web application document template. The administrator user 130 can modify the template to generate the web application document 104. In some examples, the administrator 130 can also modify an existing web application document 104.

Figure 2:
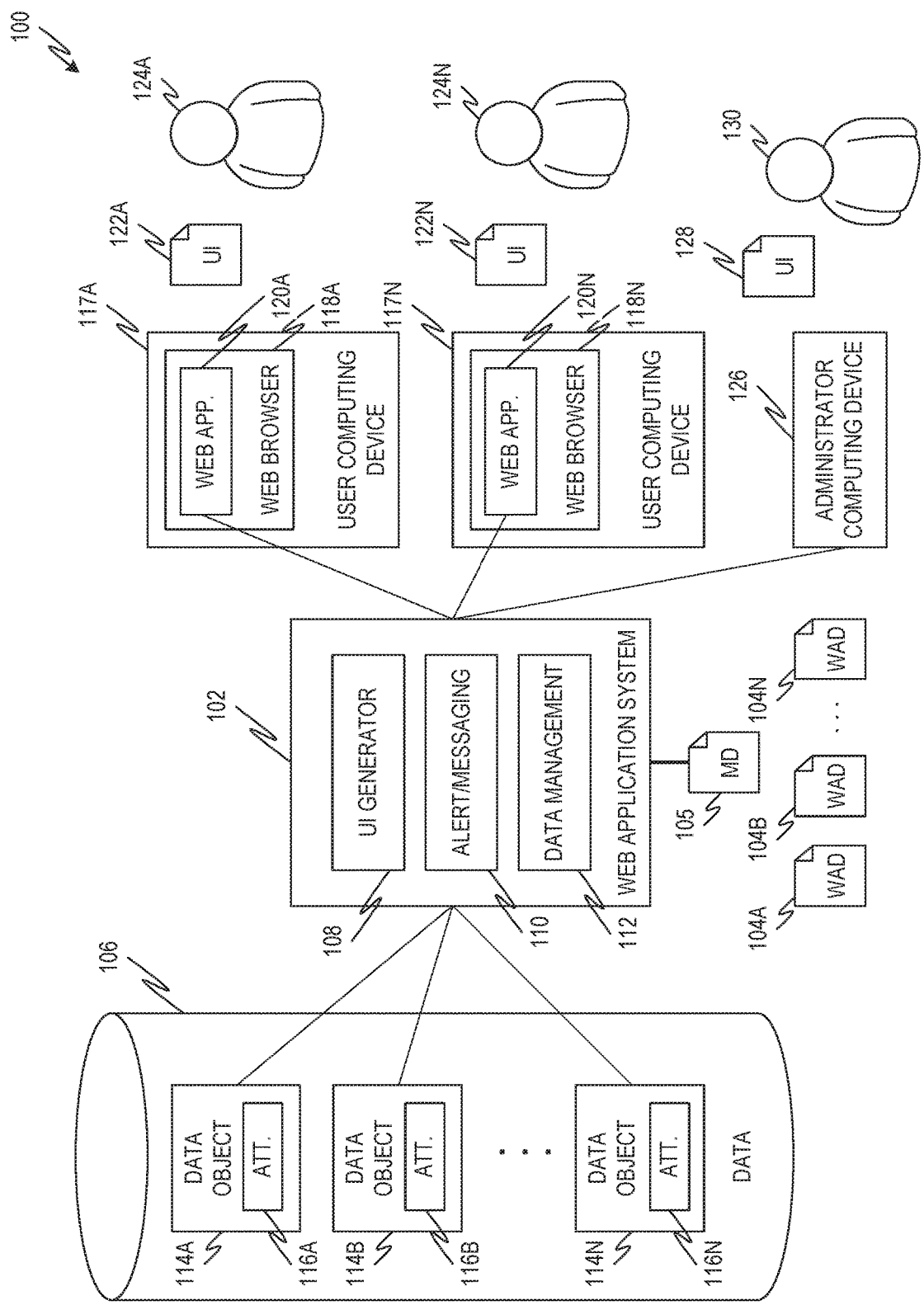
FIG. 2 is a diagram showing another example of the environment where the web application system is configured to utilize a master web application document in conjunction with a number of web application documents.

FIG. 2 is a diagram showing another example of the environment 100 where the web application system 102 is configured to utilize a master web application document 105 in conjunction with a number of web application documents 104A, 104B, 104N. In this example, the master web application document 105 describes conditions for launching various different web applications described by the respective web application documents 104A, 104B, 104N. Each web application document 104A, 104B, 104N can support a different web application executed through web application instances 120A, 120N. For example, different web applications can correspond to different projects or other business activities. The master web application document 105 can include object data describing data objects common to more than one of the other web applications. The master web application document 105 can also include UI data describing one or more UI pages from which the users 124A, 124N can launch different web applications. The master web application document 105 can also include rule data describing rules that are common to more than one of the other web applications. In some examples, a user 124A launches a web application via a master UI screen described by the master web application document 105. At this point, the web application system 102 can execute the selected web application through one or more web application instances 120A, 120N according to the selected web application document 104A, 104B, 104N as described herein.

Figure 3:
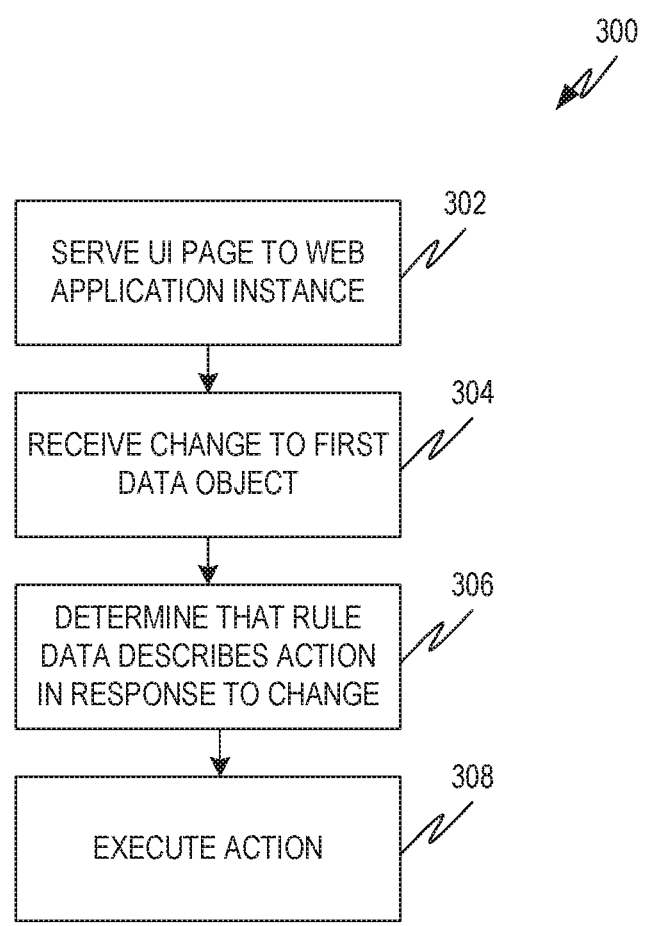
FIG. 3 is a flowchart showing one example of a process flow that may be executed by the web application system to execute a web application according to a web application document.

FIG. 3 is a flowchart showing one example of a process flow 300 that may be executed by the web application system 102 to execute a web application according to a web application document 104, 104A, 104B, 104N. At operation 302, the web application system 102 (e.g., the UI generator subsystem 108 thereof) serves a UI page to a web application instance 120A, 120N.

The UI page is defined, for example, by UI data at the relevant web application document 104, 104A, 104B, 104N. At operation 304, the web application system 102 receives a change to a data object 114A, 114B, 114B through the UI page. For example, the UI page can include a UI element such as a field that receives a new or updated value for a data object 114A, 114B, 114N and/or data object attribute 116A, 116B, 116N. The user 124A, 124N can enter a new or updated value for the data object 114A, 114B, 114N and/or data object attribute 116A. 116B, 116N at the field. In another example, the UI page can include a button that, when selected, allows the user 124A, 124N to download and/or upload an example of a data object 114A, 114B, 114N.

At operation 306, the web application system 102 determines that rule data at the relevant web application document 104, 104A, 104B, 104N describes an action to be performed by the web application system 102 in response to the data object change at operation 304. The web application system 102 executes the action at operation 308.

The action called for by the rule data and executed at operation 308 can be any suitable action. In some examples, the action includes sending an e-mail or other electronic message by the alert/messaging system 110. For example, the e-mail or other electronic message can be a notification notifying a recipient (one or more of users 124A, 124N, 130) that the change to the data object has taken place. In some examples, the e-mail or other electronic message includes an invitation for the recipient to approve the change to the data object. For example, the electronic message can include a link that points to the web application system. When the link is selected by the recipient user 124A, 124N at a user computing device 117A, 117N, it may cause the web application system 102 to serve a UI page to the user computing device 117A, 117N through a web application instance 120A, 120N executing at the user computing device 117A, 117N. The UI page, for example, can include a UI element inviting the recipient user 124A, 124N to approve the change to the data object (or not).

In some examples, the e-mail or other electronic message includes a calendar item, such as an ICS (.ics) file. The calendar item may invite the recipient or recipients to a meeting, for example, based on the change to the data item. In another example, the action can include modifying another data object 114A, 114B, 114N or attribute 116A, 116B, 116N.

Figure 4:
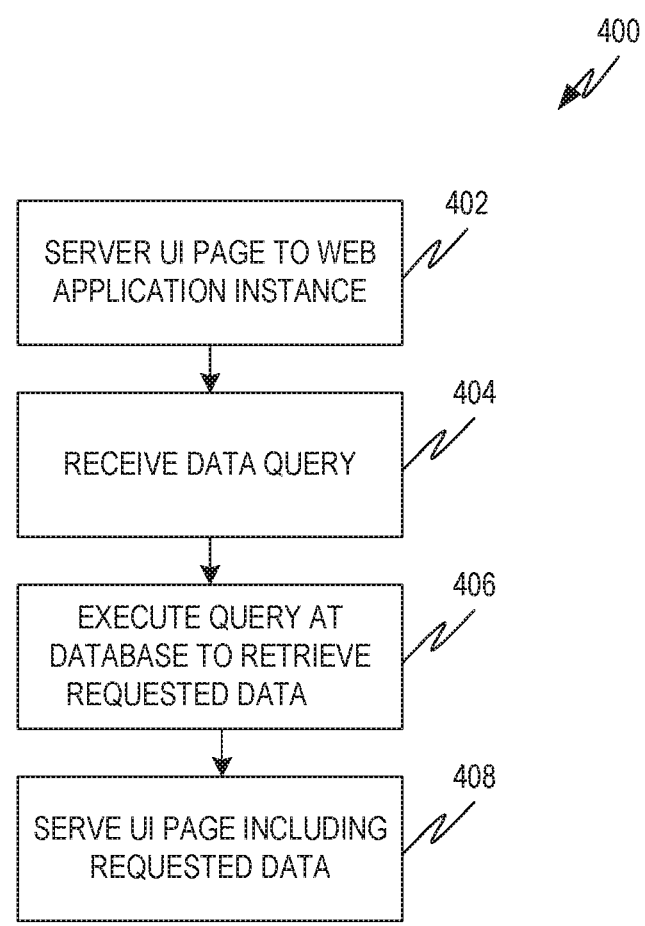
FIG. 4 is a flowchart showing another example of a process flow that can be executed by the web application system to execute a web application according to a web application document.

FIG. 4 is a flowchart showing another example of a process flow 400 that can be executed by the web application system 102 to execute a web application according to a web application document. In the process flow 400, a user 124A, 124N uses a web application instance 120A, 120N and web application system 102 to access a data objects 114A, 114B, 114N.

At operation 402, the web application system 102 (e.g., the UI generator subsystem 108) serves a UI page to a web application instance 120A, 120N. At operation 404, the web application system 102 receives from the web application instance 120A, 120N a data request for one or more data objects 114A, 114B, 114N. For example, the user 124A, 124N may select a button or other UI element from the UI page. The UI element can have an action associated therewith in the web application document 104, 104A, 104B, 104N that includes querying one or more data objects 114A, 114B, 114N or attributes 116A, 116B, 116N thereof using the web application instance 120A, 120N. In another example, the UI page can include a field or fields for receiving a user query requesting one or more data objects 114A, 114B, 114N or attributes 116A, 116B, 116N thereof. The query can identify a specific data object 114A, 114B, 114N or attribute 116A, 116B, 116N thereof and/or can request data objects 114A, 114B, 114N or attributes 116A, 116B, 116N thereof that are consistent with one or more query conditions.

At operation 406, the web application system 102 (e.g., the data management subsystem 112 thereof) can execute the query at the database 106, returning one or more data objects 114A, 114B, 114N or attributes 116A, 116B, 116N thereof. At operation 408, the web application 102 (e.g., the UI generator subsystem 108 thereof) generates an updated UI page including the requested data objects 114A, 114B, 114N or attributes 116A, 116B, 116N thereof and serves the UI page to the requesting web application instance 120A, 120N. The updated UI page, for example, can be described by the relevant web application document 104, 104A, 104B, 104N.

Figure 5:
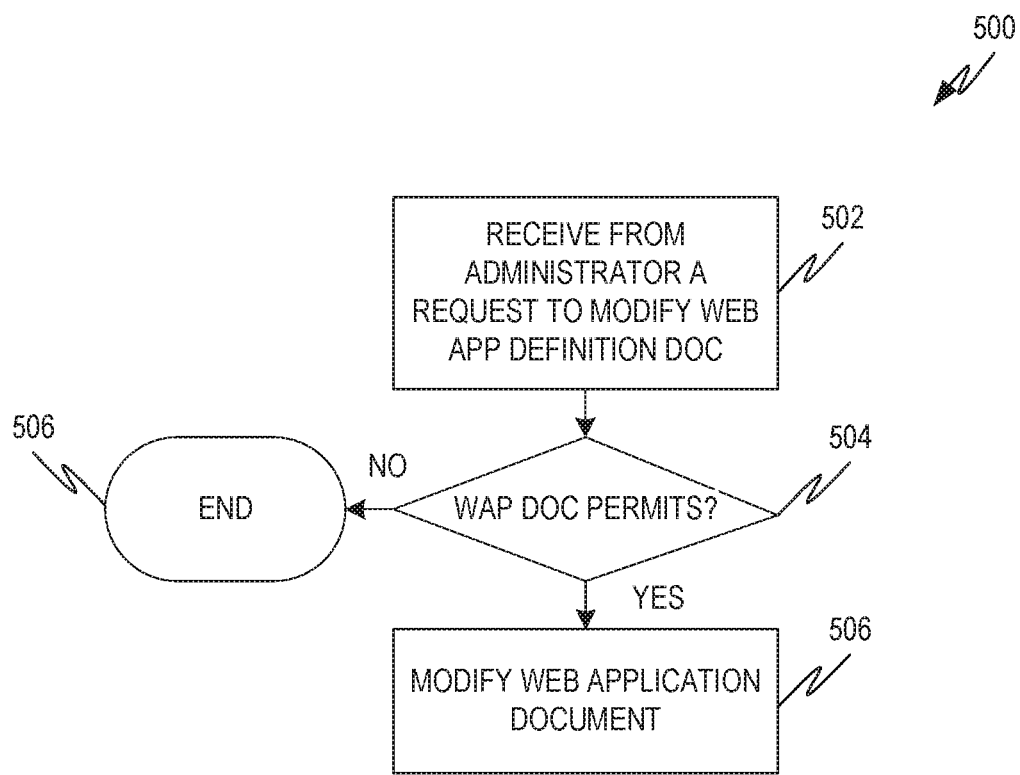
FIG. 5 is a flowchart showing one example of a process flow that can be executed by the web application system to modify a web application document or master document.

In some examples, the administrative user 130 can modify a web application document 104, 104A, 104B, 104N to change the behavior of the web application system 102. FIG. 5 is a flowchart showing one example of a process flow 500 that can be executed by the web application system 102 to modify a web application document 104, 104A, 104B, 104N or master document 105.

At operation 502, the web application system receives a request to modify a web application document 104, 104A, 104B, 104N or master document 105 from an administrator computing device 126. For example, an administrator user 130 can enter data describing a modification to the web application document 104, 104A, 104B, 104N or master document 105 via the administrator UI 128. At operation 504, the web application system 102 determines whether the requested modification is permitted. For example, a web application document 104, 104A, 104B, 104N or master document 105 may include rule data describing permitted modifications and/or modifications that are not permitted. If the requested modification is not permitted, the process flow 500 may end at operation 506. If the modification is permitted, the web application system modifies the web application document to implement the modification at operation 506. The web application system and web application instances 120A, 120N may continue to operate according to the modified a web application document 104, 104A, 104B, 104N or master document 105.

Figure 6:
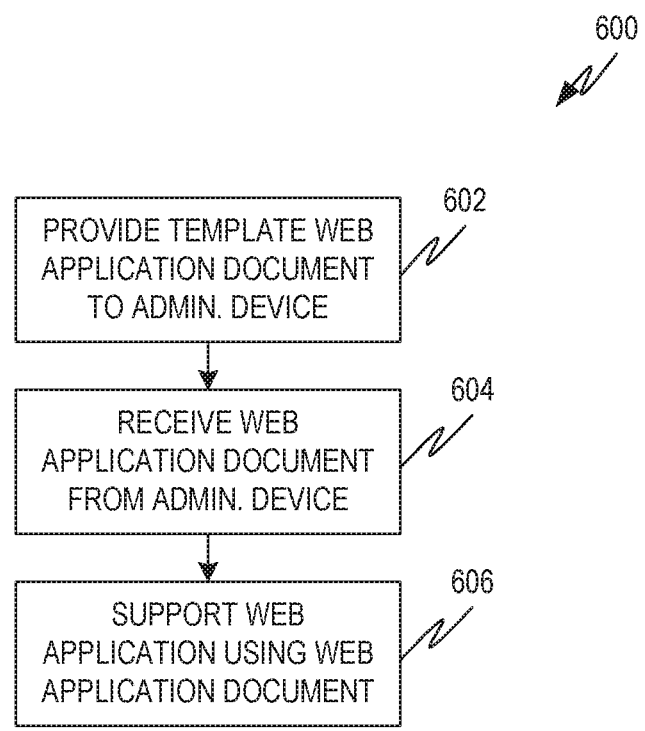
FIG. 6 is a flowchart showing one example of a process flow that can be executed by the web application system to generate a web application document for supporting web application instances.

FIG. 6 is a flowchart showing one example of a process flow 600 that can be executed by the web application system 102 to generate a web application document 104, 104A, 104B, 104N for supporting web application instances 120A, 120N. At operation 602, the web application system 102 provides a template web application document to the administrator computing device 126. The template web application document can include template object data, template user interface data, and/or template rule data. The template data can include, for example, template markup language tags corresponding to objects, UI screens, and/or rules. In some examples, the template data also includes template or dummy data that the administrator user 130 can modify. In some examples, the administrator computing device 126 already stores the template web application document and the operation 602 is omitted.

The administrator user 130, via the administrator UI 128 provided by the administrator computing device 126, can modify the template web application document to generate a web application document 104, 104A, 104B, 104N. For example, the administrator user 130 can replace and/or supplement template object data with object data, for example, corresponding to data objects 114A, 114B, 114N. Also, for example, the administrator user 130 can replace and/or supplement template UI data with UI data corresponding to UI screens, as described herein. Also, for example, the administrator user 130 can replace and/or supplement template rule data with rule data corresponding to one or more rules, as described herein.

At operation 604, the web application system 102 receives the web application document 104, 104A, 104B, 104N from the administrator computing device 126. At operation 606, the web application system 102 supports web application instances 120A, 120B in accordance with the received web application document 104, 104A, 104B, 104N as described herein.

Figure 7:
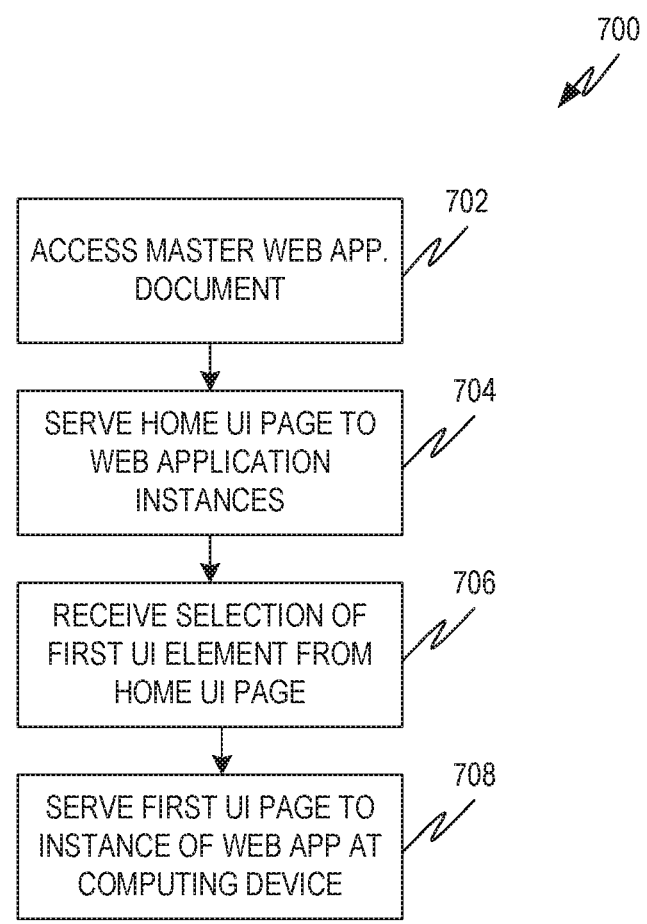
FIG. 7 is a flowchart showing one example of a process flow that may be executed by the web application system 102 utilizing a master document to support multiple web applications, as described with respect to FIG. 2.

FIG. 7 is a flowchart showing one example of a process flow 700 that may be executed by the web application system 102 utilizing a master document 105 to support multiple web applications, as described with respect to FIG. 2. At operation 702, the web application system 102 accesses the master web document 105. For example, the web application system 102 (the UI generator subsystem 108 thereof) accesses UI data at the master document 105 describing a home UI page. The home UI can include one or more buttons, fields, tabs, or other UI elements that are associated in the master document 105 with different web application documents 104A, 104B, 104N. At operation 704, the web application system 102 (e.g., the UI generator subsystem 108 thereof) serves the home UI page to a web application instances 120A, 120N.

At operation 706, the web application system 102 receives a selection of a first UI elements of the home UI page. For example, the user 124A, 124N selects one of the elements via the UI 122A, 122N of the web application instance 120A, 120N. The selected UI element corresponds to one of the web applications associated with the web application documents 104A, 104B, 104N. At operation 708, the web application system 102 serves to the web application instance 120A, 120N a web application UI page described by the web application document 104A, 104B, 104N corresponding to the selected UI element of operation 706. The web application system 102 may continue to support the web application corresponding to the selected web application document 104A, 104B, 104N, for example, as described herein.

Figure 8:
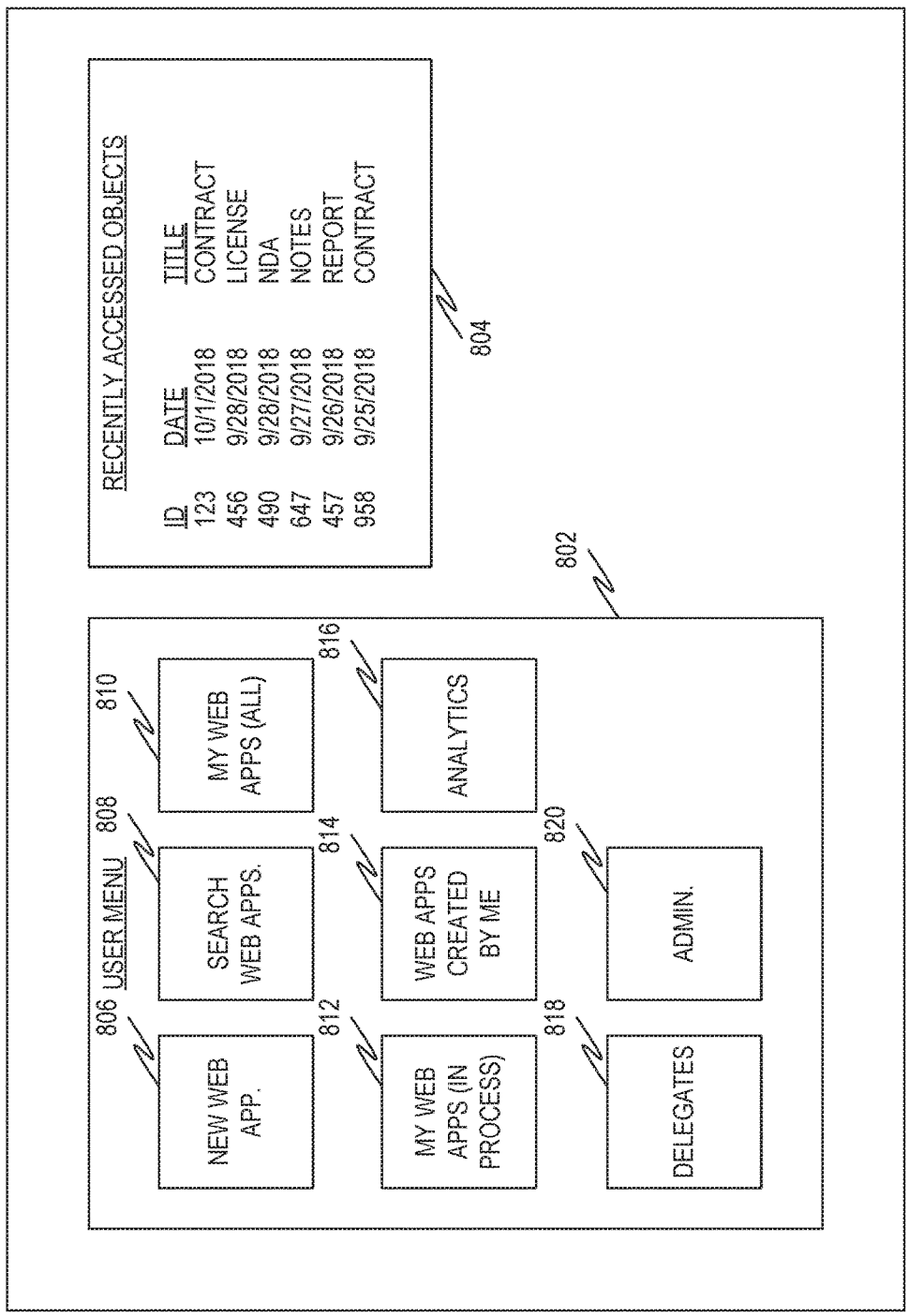
FIG. 8 is a diagram showing one example of a UI page described by a master web application document that may be served to a web application instance.

FIG. 8 is a diagram showing one example of a UI page 800 described by a master web application document 105 that may be served to a web application instance 120A, 120N. The UI page 800 includes elements 802, 804, 806, 808, 810, 812, 814, 816, 818, 820. Tile element 802 includes button elements 806, 808, 810, 812, 814, 818, 820. The master web application document 105 can define actions to be performed by the web application system 102 when the respective elements are selected.

For example, when a user 124A, 124N, 130 selects button element 806, the web application system 102 may execute a process for generating a new web application, for example, by generating a new web application document 104, 104A, 104B, 104N. For example, in response to selection of the button element 806, the web application system 102 may execute the process flow 600. When a user 124A, 124N, 130 selects button element 808, the web application system 102 may return a UI page with a field or fields where the user 124A, 124N. 130 can enter query conditions to query the database 106 to return data objects 114A, 114B, 14N and/or attributes 116A, 116B, 116N describing web applications. Upon receiving query conditions, the web application system 102 may query the database to return web applications (e.g., web applications with associated web application documents 104, 104A, 104B, 104N) that meet the query conditions.

When a user 124A, 124N, 130 selects button elements 810, 812, 814, the web application system 102 can return web applications that match predetermined sets of query conditions. For example, upon selection of the button element 810, the web application system 102 can return all web applications associated with the user 124A, 124B, 130. Upon selection of the button element 812, the web application system 102 can return all web applications that are in process (e.g., for which the user 124A, 124N, 130 is currently building a web application document). Upon selection of the button element 814, the web application system 102 can return web applications created by the user 124A, 124N, 130.

Button elements 816, 818, 820 can prompt the web application system 102 to serve other UI pages (e.g., other UI pages described by the master web application document 105). For example, selecting button element 816 may cause the web application system 102 to serve a UI page including analytical data elements describing usage of various web applications. Selecting button element 818 may cause the web application system 102 to serve a UI page including delegate users 124A, 124N, 130 who are authorized to take actions on behalf of the viewing user 124A, 124N, 130. Selecting button element 820 may cause the web application system 102 to serve a UI page including administrative data. The UI page 800 also includes a field element 804 that includes data describing recently accessed data objects, which are listed by ID, access date and title.

Figure 10:
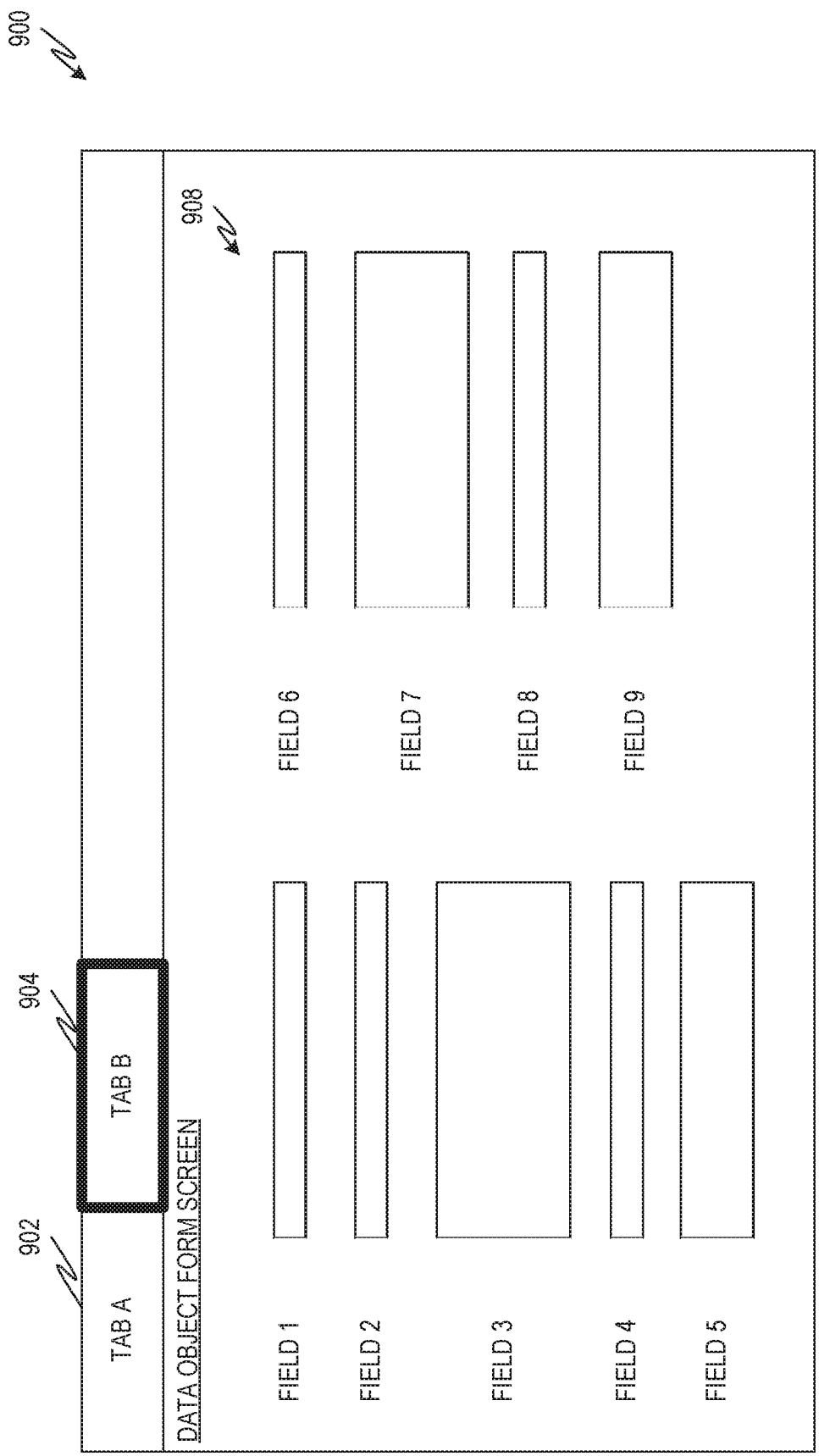
FIG. 10 is a diagram showing one example of the UI page of FIG. 9 with the tab element selected.

FIG. 9 is a diagram showing one example of a UI page 900 described by a web application document 104, 104A, 104B, 104N that may be served to a web application instance 120A, 120N. The UI page 900 includes tab elements 902, 904. In the example of FIG. 9, tab element 902 is selected. When tab 902 is selected, as shown in FIG. 9, the UI page 900 includes a field 906 that displays, for example, data objects 114A, 114B, 114N and/or attributes 116A, 116B, 116N thereof. FIG. 10 is a diagram showing one example of the UI page 900 of FIG. 9 with the tab element 904 selected. In this example, the UI page 900 includes field elements labeled FIELD 1 through FIELD 9. These fields, as defined by the web application document 104, 104A, 104B, 104N, can include data and/or can be configured to receive data entered by the user 124A, 124N, 130.

Figure 11:
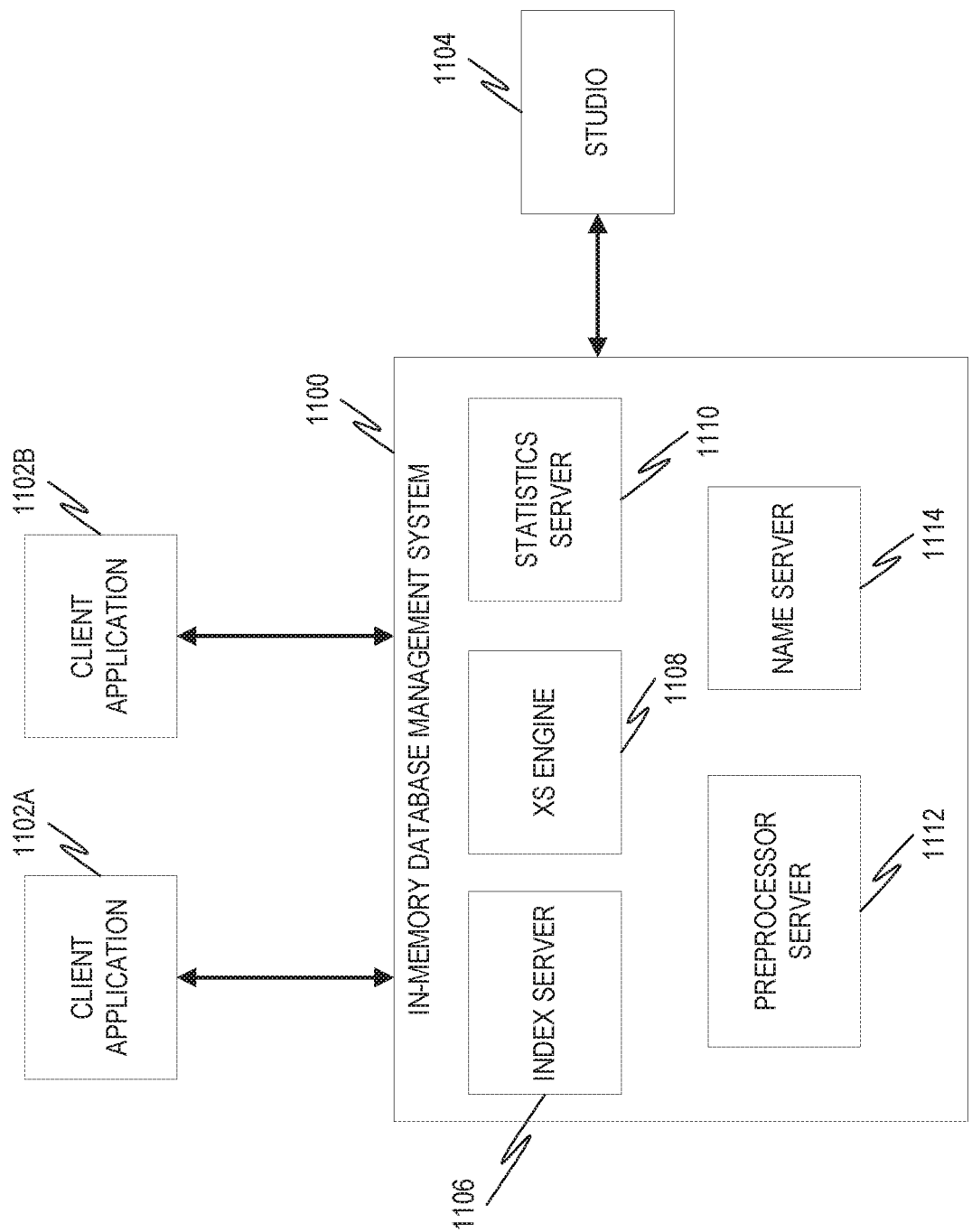
FIG. 11 is a diagram illustrating an example of an in-memory database management system that may be used to implement a web application in some examples of the network virtualization systems and methods described herein.

FIG. 11 is a diagram illustrating an example of an in-memory database management system 1100 that may be used to implement a web application in some examples described herein. An in-memory database stores data primarily at main memory, such as a random access memory (RAM). This is different than databases that primarily employ a disk storage mechanism. In some examples, the database management system 1100 may be or include an example of the HANA system from SAP SE of Walldorf, Germany. Although various features of web applications are described herein in the context of an in-memory database, network virtualization for web application queries may be generally performed for any type of web application using any suitable type of database.

The in-memory database management system 1100 may be coupled to one or more client applications 1102A, 1102B. For example, client applications 1102A, 1102B may be examples of the web application instances 120A, 120N described herein. Client applications 1102A, 1102B may execute one or more queries utilizing data from the database including, for example, presenting a user interface (UI) to one or more users, entering data, accessing data, etc., as described herein. For example, client applications 1102A, 1102B can be executed at a web application system, similar to the web application system 103, that includes a user query machine and a database query machine. The client applications 1102A, 1102B may communicate with the in-memory database management system 1100 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 11 also shows a studio 1104 that may be used to perform modeling by accessing the in-memory database management system 1100. In some examples, the studio 1104 may allow complex analysis to be performed on data drawn not only from real time event data and windows, but also from stored database information.

The in-memory database management system 1100 may comprise a number of different components, including an index server 1106, an XS engine 1108, a statistics server 1110, a preprocessor server 1112, and a name server 1114. These components may operate on a single computing device, or may be spread among multiple computing devices (e.g., separate servers). The index server 1106 contains the actual data and the engines for processing the data. It may also coordinate and uses the other servers.

The XS engine 1108 allows clients to connect to the in-memory database management system 1100 using web protocols, such as Hypertext Transfer Protocol (HTTP). Although the XS engine 1108 is illustrated as a component of the in-memory database management system 1100, in some examples, the XS engine may be implemented as one or more Application Program Interfaces (APIs) and/or services positioned between the client applications 1102A, 1102B and the in-memory database management system 1100. For example, the XS engine 1108 may be configured to perform the functions of the privilege filter 118 for client requests received in languages other than SQL such as, for example, Multidimensional Expressions (MDX), Hypertext Transfer Protocol (HTTP). Representational State Transfer (REST), Hypertext Markup Language (HTML), etc.

The statistics server 1110 collects information about status, performance, and resource consumption from all the other server components. The statistics server 1110 can be accessed from the studio 1104 to obtain the status of various alert monitors.

The preprocessor server 1112 is used for analyzing text data and extracting the information on which the text search capabilities are based.

The name server 1114 holds information about the database topology. This is used in a distributed system with instances of the database on different hosts. The name server 1114 knows where the components are running and which data is located on which server. In an example embodiment, a separate enqueue server may operate in the manner described above with respect to enqueue servers, specifically with regard to creating and managing light-weight enqueue sessions.

Figure 12:
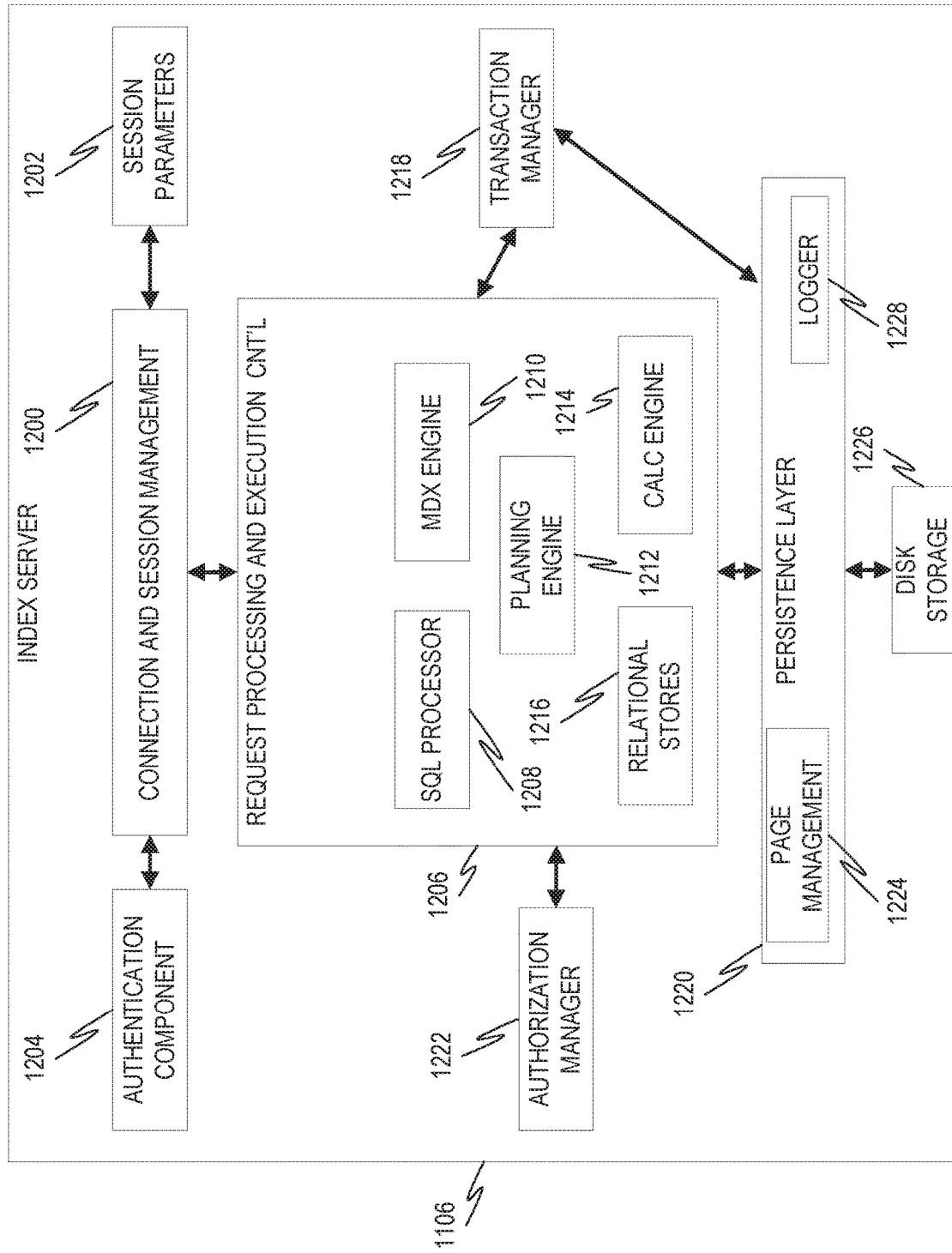
FIG. 12 is a diagram illustrating an example of the index server of FIG. 11.

The index server 1106, in some examples, may house an instance of the privilege filter 118. The instance of the privilege filter 118 at the index server 1106 may be in addition to or instead of the instance of the privilege filter 118 at the XS engine 1108. FIG. 12 is a diagram illustrating an example of the index server 1106. Specifically, the index server 1106 of FIG. 11 is depicted in more detail. The index server 1106 includes a connection and session management component 1200, which is responsible for creating and managing sessions and connections for the database clients (e.g. client applications 1102A, 1102B). Once a session is established, clients can communicate with the database system using SQL statements. For each session, a set of session parameters 1202 may be maintained, such as auto-commit, current transaction isolation level, etc. Users (e.g., system administrators, developers) may be authenticated by the database system itself (e.g., by logging in with log-in information such as a user name and password, using an authentication component 1204) or authentication can be delegated to an external authentication provider such as a Lightweight Directory Access Protocol (LDAP) directory.

Client queries can be analyzed and executed by a set of components summarized as request processing and execution control 1206. An SQL processor 1208 checks the syntax and semantics of the client SQL statements and generates a logical execution plan. Multidimensional expressions (MDX) is a language for querying and manipulating multi-dimensional data stored in OLAP cubes. As such, an MDX engine 1210 may be provided to allow for the parsing and executing of MDX commands. A planning engine 1212 allows applications to execute basic planning operations in the database layer. One such operation is to create a new version of a dataset as a copy of an existing dataset, while applying filters and transformations.

A calculation engine 1214 implements the various SQL script and planning operations. The calculation engine 1214 creates a logical execution plan for calculation models derived from SQL script, MDX, planning, and domain-specific models. This logical execution plan may include, for example, breaking up a model into operations that can be processed in parallel. The data is stored in relational stores 1216, which implement a relational database in main memory. Each SQL statement may be processed in the context of a transaction. New sessions are implicitly assigned to a new transaction. A transaction manager 1218 coordinates database transactions, controls transactional isolation, and keeps track of running and closed transactions. When a transaction is committed or rolled back, the transaction manager 1218 informs the involved engines about this event so they can execute needed actions. The transaction manager 1218 also cooperates with a persistence layer 1220 to achieve atomic and durable transactions.

An authorization manager 1222 is invoked by other database system components to check whether the user has the specified privileges to execute the requested operations. The database system allows for the granting of privileges to users or roles. A privilege grants the right to perform a specified operation on a specified object.

The persistence layer 1220 ensures that the database is restored to the most recent committed state after a restart and that transactions are either completely executed or completely undone. To achieve this goal in an efficient way, the persistence layer 1220 uses a combination of write-ahead logs, shadow paging, and save points. The persistence layer 1220 also offers a page management interface 1224 for writing and reading data to a separate disk storage 1226, and also contains a logger 1228 that manages the transaction log. Log entries can be written implicitly by the persistence layer 1220 when data is written via the persistence interface or explicitly by using a log interface.

Figure 13:
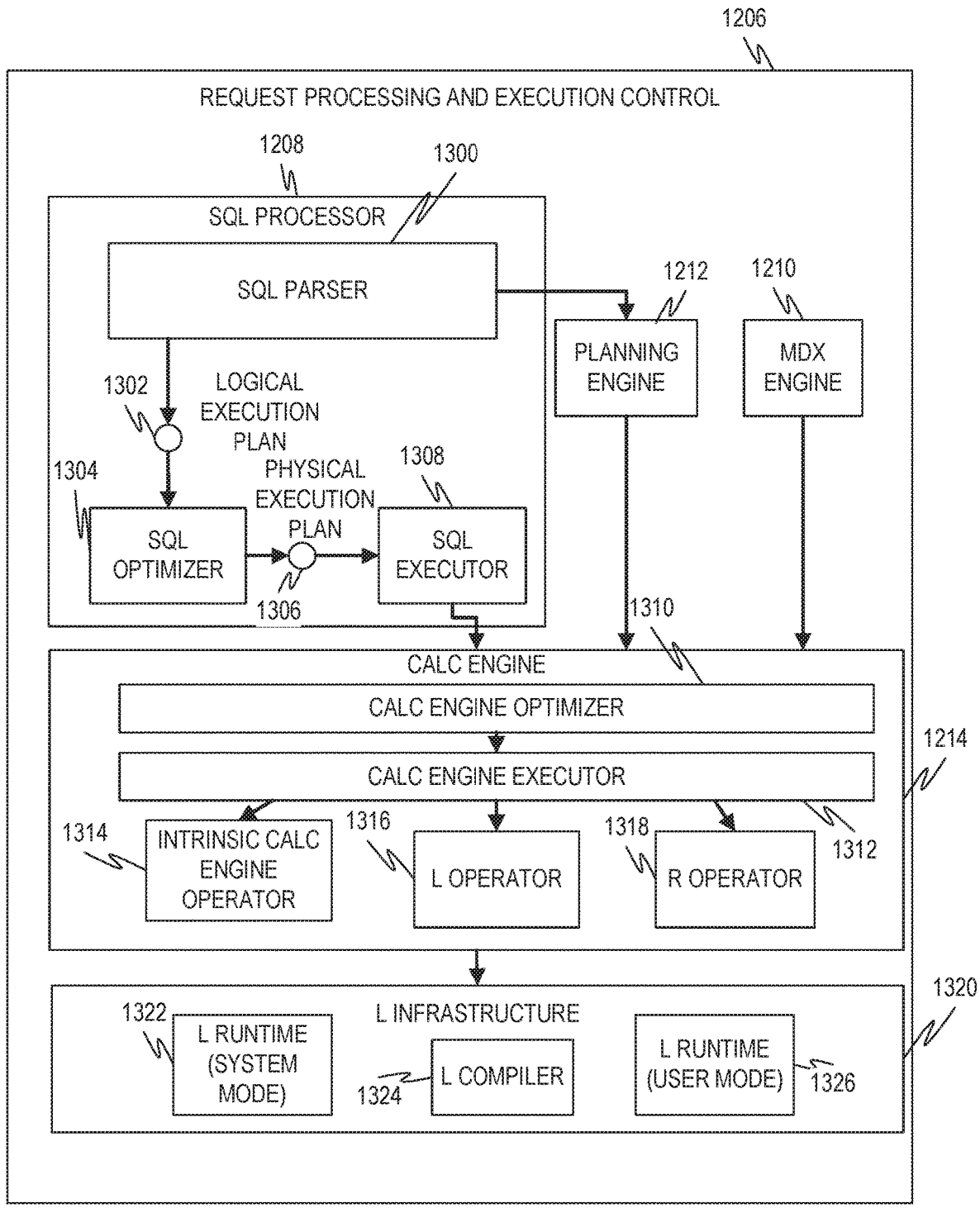
FIG. 13 is a diagram illustrating one example of the request processing and execution control of FIG. 11.

FIG. 13 is a diagram illustrating one example of the request processing and execution control 1206. This diagram depicts the request processing and execution control 1206 of FIG. 12 in more detail. The SQL processor 1208 contains an SQL parser 1300, which parses the SQL statement and generates a logical execution plan 1302, which it passes to an SQL optimizer 1304. The SQL optimizer 1304 optimizes the logical execution plan 1302 and converts it to a physical execution plan 1306, which it then passes to a SQL executor 1308. The calculation engine 1214 implements the various SQL script and planning operations, and includes a calc engine optimizer 1310, which optimizes the operations, and a calc engine executor 1312, which executes the operations, as well as an intrinsic calc engine operator 1314, an L operator 1316, and an R operator 1318.

An L infrastructure 1320 includes a number of components to aid in the running of L procedures, including an L-runtime (system mode) 1322, an L compiler 1324, and an L-runtime (User mode) 1326.

EXAMPLES

Example 1 is a web-based information system, comprising: a database storing a plurality of data objects; and a web application system to serve a web application for execution at a user computing device, the web application system programmed to perform operations comprising: accessing a web application document, the web application document comprising: object data describing at least a portion of the plurality of data objects; user interface data describing a first user interface page to display data object attributes; and rule data describing at least one action to be performed by the web application system in response to a change in a first data object; serving the first user interface page to a first instance of a web application executing at a first user computing device, the first user interface page including first data object attributes of the first data object; receiving, through the first user interface page, a change to the first data object; determining that the rule data describes a first action to be executed in response to the change to the first data object; and executing the first action.

In Example 2, the subject matter of Example 1 optionally includes wherein the operations further comprise: providing to an administrator computing device a template web application document, the template web application document comprising template object data, template user interface data, and template rule data; and receiving, from the administrator computing device, the web application document, wherein the web application document is a modification of the template web application document.

In Example 3, the subject matter of any one or more of Examples 1-2 optionally include wherein the first action comprises sending an electronic message indicating the change to the first data object to a first user.

In Example 4, the subject matter of Example 3 optionally includes wherein the electronic message comprises a calendar item directed to the first user.

In Example 5, the subject matter of any one or more of Examples 3-4 optionally include wherein the electronic message comprises a link pointed to the web application system that, when selected at a second user computing device, causes the second user computing device to launch a second user interface page described by the web application document at a second instance of the web application executing at the second user computing device.

In Example 6, the subject matter of any one or more of Examples 1-5 optionally include wherein the first action comprises modifying a second data object of the plurality of data objects.

In Example 7, the subject matter of any one or more of Examples 1-6 optionally include wherein the web application system is further programmed to perform operations comprising: receiving, through the first user interface page, a data request; executing at the database a view query to return a plurality of data objects corresponding to the data request; and serving, to the first instance of the web application executing at the first user computing device, a second user interface page describing the plurality of data objects returned by the view query.

In Example 8, the subject matter of any one or more of Examples 1-7 optionally include wherein the web application system is further programmed to perform operations comprising: receiving, from an administrator computing device, a request to modify the web application document; determining that object data of the web application document indicates that an administrative user of the administrator computing device is permitted to modify the web application document; and modifying the web application document in response to the request.

In Example 9, the subject matter of any one or more of Examples 1-8 optionally include wherein the web application system is further programmed to perform operations comprising: accessing a master web application document, the master web application document comprising home user interface data describing a home user interface page, the home user interface page comprising a plurality of user interface elements, wherein a first user interface element of the plurality of user interface elements, when selected, causes the web application system to serve the first user interface page, and a second user interface element of the plurality of user interface elements, when selected, cause the web application system to serve a second user interface page associated with a second web application; serving the home user interface data to the first user computing device for display at a web browser executing at the first user computing device; and receiving from the first user computing device a selection of the first user interface element, wherein the serving of the first user interface page is responsive to the selection of the first user interface element.

Example 10 is a method for implementing a web-based information system, comprising: accessing a web application document, the web application document comprising: object data describing at least a portion of the plurality of data objects; user interface data describing a first user interface page to display data object attributes; and rule data describing at least one action to be performed by the web application system in response to a change in a first data object; serving the first user interface page to a first instance of a web application executing at a first user computing device, the first user interface page including first data object attributes of the first data object; receiving, through the first user interface page, a change to the first data object; determining that the rule data describes a first action to be executed in response to the change to the first data object; and executing the first action.

In Example 11, the subject matter of Example 10 optionally includes wherein the operations further comprise: providing to an administrator computing device a template web application document, the template web application document comprising template object data, template user interface data, and template rule data, and receiving from the administrator computing device the web application document, wherein the web application document is a modification of the template web application document.

In Example 12, the subject matter of any one or more of Examples 10-11 optionally include wherein the first action comprises sending an electronic message indicating the change to the first data object to a first user.

In Example 13, the subject matter of Example 12 optionally includes wherein the electronic message comprises a calendar item directed to the first user.

In Example 14, the subject matter of any one or more of Examples 12-13 optionally include wherein the electronic message comprises a link pointed to the web application system that, when selected at a second user computing device, causes the second user computing device to launch a second user interface page described by the web application document at a second instance of the web application executing at the second user computing device.

In Example 15, the subject matter of any one or more of Examples 10-14 optionally include wherein the first action comprises modifying a second data object of the plurality of data objects.

In Example 16, the subject matter of any one or more of Examples 10-15 optionally include wherein the web application system is further programmed to perform operations comprising: receiving, through the first user interface page, a data request; executing at the database a view query to return a plurality of data objects corresponding to the data request; and serving, to the first instance of the web application executing at the first user computing device, a second user interface page describing the plurality of data objects returned by the view query.

In Example 17, the subject matter of any one or more of Examples 10-16 optionally include wherein the web application system is further programmed to perform operations comprising: receiving, from an administrator computing device, a request to modify the web application document; determining that object data of the web application document indicates that an administrative user of the administrator computing device is permitted to modify the web application document; and modifying the web application document in response to the request.

In Example 18, the subject matter of any one or more of Examples 10-17 optionally include wherein the web application system is further programmed to perform operations comprising: accessing a master web application document, the master web application document comprising home user interface data describing a home user interface page, the home user interface page comprising a plurality of user interface elements, wherein a first user interface element of the plurality of user interface elements, when selected, causes the web application system to serve the first user interface page, and a second user interface element of the plurality of user interface elements, when selected, cause the web application system to serve a second user interface page associated with a second web application; serving the home user interface data to the first user computing device for display at a web browser executing at the first user computing device; and receiving from the first user computing device a selection of the first user interface element, wherein the serving of the first user interface page is responsive to the selection of the first user interface element.

Example 19 is a non-transitory machine-readable medium comprising instructions thereon that, when executed by at least one processor, causes the at least one processor to perform operations comprising: accessing a web application document, the web application document comprising: object data describing at least a portion of the plurality of data objects; user interface data describing a first user interface page to display data object attributes; and rule data describing at least one action to be performed by the web application system in response to a change in a first data object; serving the first user interface page to a first instance of a web application executing at a first user computing device, the first user interface page including first data object attributes of the first data object; receiving, through the first user interface page, a change to the first data object; determining that the rule data describes a first action to be executed in response to the change to the first data object; and executing the first action.

In Example 20, the subject matter of Example 19 optionally includes wherein the operations further comprise: providing to an administrator computing device a template web application document, the template web application document comprising template object data, template user interface data, and template rule data and receiving from the administrator computing device the web application document, wherein the web application document is a modification of the template web application document.

Software Architecture

Figure 14:
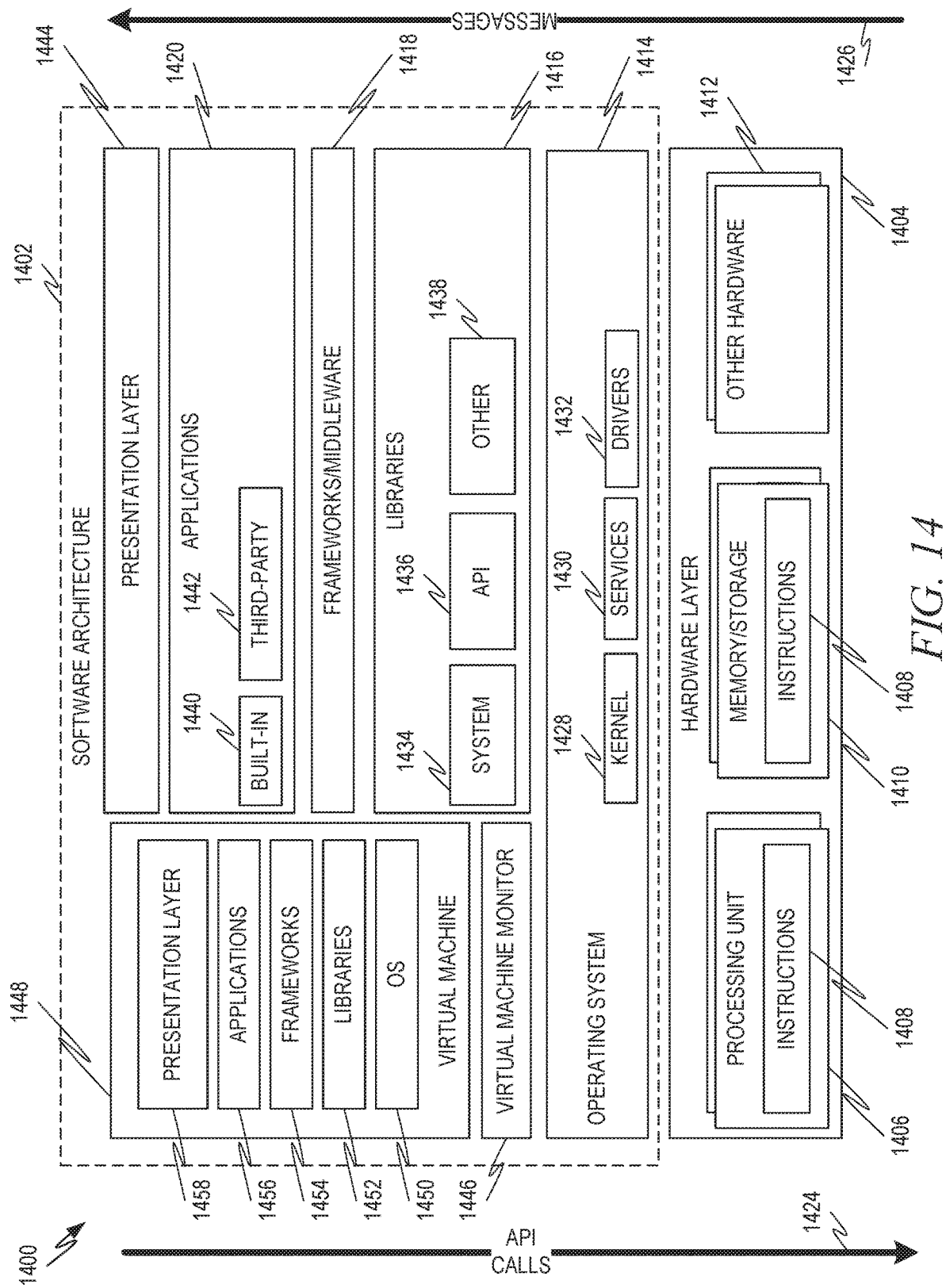
FIG. 14 is a block diagram showing one example of a software architecture for a computing device.

FIG. 14 is a block diagram 1400 showing one example of a software architecture 1402 for a computing device. The architecture 1402 maybe used in conjunction with various hardware architectures, for example, as described herein. FIG. 14 is merely a non-limiting example of a software architecture and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system 1100 of FIG. 11.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of computer system 1100.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420 and presentation layer 1444. Operationally, the applications 1420 and/or other components within the layers may invoke application programming interface (API) calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers. Bluetooth® drivers, flash memory drivers, serial communication drivers (e.g., Universal Serial Bus (USB) drivers). Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules. In some examples, libraries 1438 may provide one or more APIs serviced by a message oriented middleware.

The frameworks 1418 (also sometimes referred to as middleware) may provide a higher-level common infrastructure that may be utilized by the applications 1420 and/or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 includes built-in applications 1440 and/or third party applications 1442. Examples of representative built-in applications 1440 may include, but are not limited to, a contacts application, a browser application, a book reader application, a location application, a media application, a messaging application, and/or a game application. Third party applications 1442 may include any of the built in applications as well as a broad assortment of other applications. In a specific example, the third party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system 1434, APIs 1436, and other libraries 1438), frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456 and/or presentation layer 1458. These layers of software architecture executing within the virtual machine 1448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including Electronic Apparatus and System Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 15:
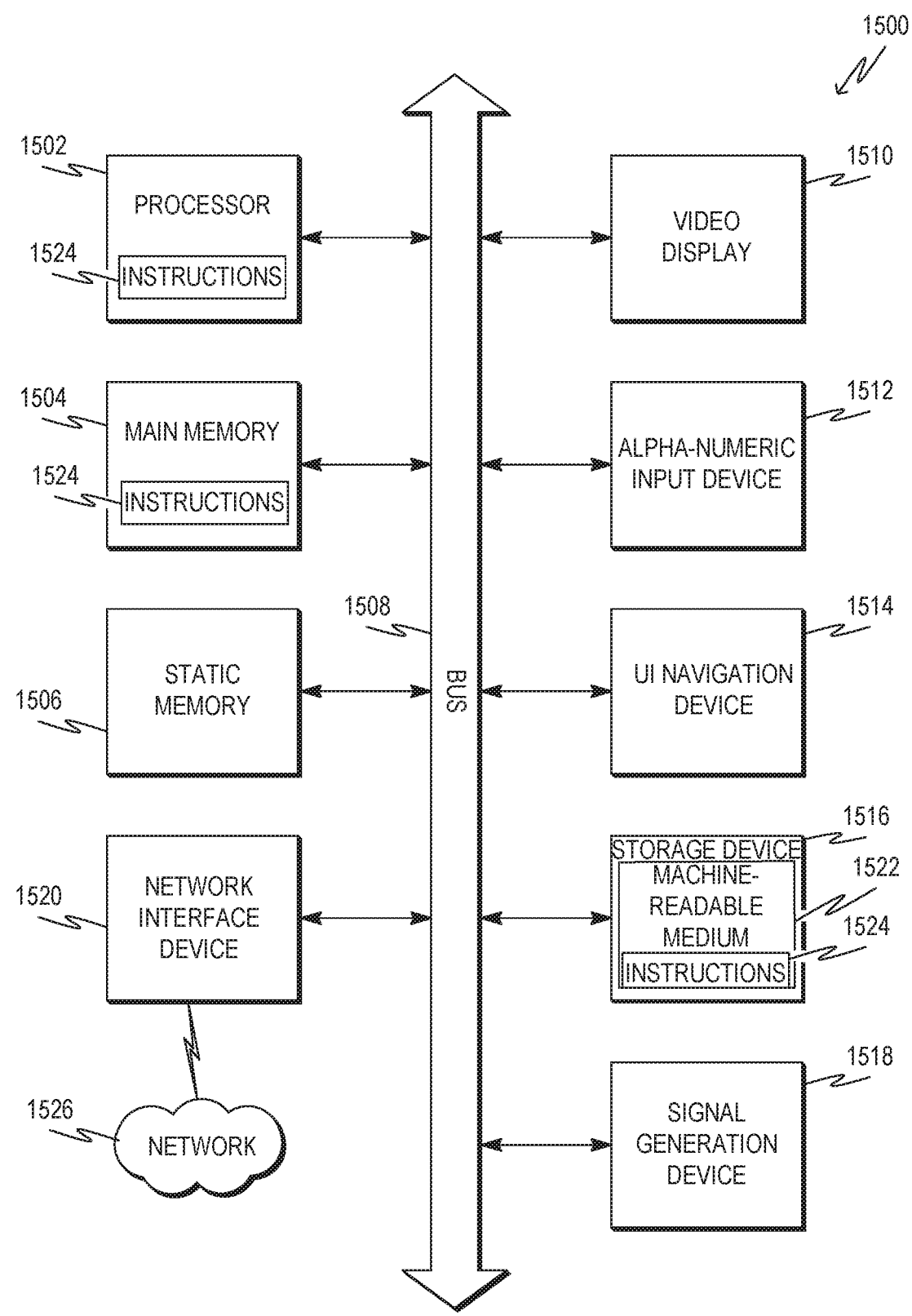
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A web-based information system, comprising:
a database storing a plurality of data objects; and
a web application system programmed to perform operations comprising:
receiving, from a first user computing device, a request for a web application;
responsive to the request, sending web application code to the first user computing device, the web application code executable by a web browser of the first user computing device to implement a first instance of the web application at the user computing device;
accessing a master web application document, the master web application document comprising home user interface data describing a home user interface page, the home user interface page comprising:
a first user interface element that, when selected, causes the web application system to operate the first instance of the web application according to a first web application document; and
a second user interface element that, when selected, causes the web application system to operate the first instance of the web application according to a second web application document;
serving the home user interface data to the first instance of the web application at the user computing device;
receiving from the first user computing device a selection of the first user interface element;
responsive to the selection of the first user interface element, accessing the first web application document, the first web application document comprising:
object data describing at least a portion of the plurality of data objects;
user interface data describing a first user interface page to display data object attributes; and
rule data describing at least one action to be performed by the web application system in response to a change in a first data object;
serving the first user interface page to the first instance of the web application executing at the first user computing device, the first user interface page including first data object attributes of the first data object;
receiving, from the first instance of the web application and through the first user interface page, a change to the first data object;
determining that the rule data describes a first action to be executed in response to the change to the first data object; and
executing the first action.

2. The web-based information system of claim 1, wherein the operations further comprise:
providing to an administrator computing device a template web application document, the template web application document comprising template object data, template user interface data, and template rule data; and
receiving, from the administrator computing device, the first web application document, wherein the first web application document is a modification of the template web application document.

3. The web-based information system of claim 1, wherein the first action comprises sending an electronic message indicating the change to the first data object to a first user.

4. The web-based information system of claim 3, wherein the electronic message comprises a calendar item directed to the first user.

5. The web-based information system of claim 3, wherein the electronic message comprises a link pointed to the web application system that, when selected at a second user computing device, causes the second user computing device to launch a second user interface page described by the first web application document at a second instance of the web application executing at the second user computing device.

6. The web-based information system of claim 1, wherein the first action comprises modifying a second data object of the plurality of data objects.

7. The web-based information system of claim 1, wherein the web application system is further programmed to perform operations comprising:
receiving, through the first user interface page, a data request;
executing at the database a view query to return a plurality of data objects corresponding to the data request; and
serving, to the first instance of the web application executing at the first user computing device, a second user interface page describing the plurality of data objects returned by the view query.

8. The web-based information system of claim 1, wherein the web application system is further programmed to perform operations comprising:
receiving, from an administrator computing device, a request to modify the first web application document;
determining that object data of the first web application document indicates that an administrative user of the administrator computing device is permitted to modify the first web application document; and
modifying the first web application document in response to the request.

9. A method for implementing a web application system, comprising:
- receiving, from a first user computing device, a request for a web application;
- responsive to the request, sending web application code to the first user computing device, the web application code executable by a web browser of the first user computing device to implement a first instance of the web application at the user computing device;
- accessing a master web application document, the master web application document comprising home user interface data describing a home user interface page, the home user interface page comprising:
  - a first user interface element that, when selected, causes the web application system to operate the first instance of the web application according to a first web application document; and
  - a second user interface element that, when selected, causes the web application system to operate the first instance of the web application according to a second web application document;
- serving the home user interface data to the first instance of the web application at the user computing device;
- receiving from the first user computing device a selection of the first user interface element;
- responsive to the selection of the first user interface element, accessing the first web application document, the first web application document comprising:
  - object data describing at least a portion of a plurality of data objects stored at a database accessible to the web application system;
  - user interface data describing a first user interface page to display data object attributes; and
  - rule data describing at least one action to be performed by the web application system in response to a change in a first data object;
- serving the first user interface page to the first instance of the web application executing at a first user computing device, the first user interface page including first data object attributes of the first data object;
- receiving, from the first instance of the web application and through the first user interface page, a change to the first data object;
- determining that the rule data describes a first action to be executed in response to the change to the first data object; and
- executing the first action.

10. The method of claim 9, further comprising:
- providing to an administrator computing device a template web application document, the template web application document comprising template object data, template user interface data, and template rule data; and
- receiving from the administrator computing device the web application document, wherein the web application document is a modification of the template web application document.

11. The method of claim 9, wherein the first action comprises sending an electronic message indicating the change to the first data object to a first user.

12. The method of claim 11, wherein the electronic message comprises a calendar item directed to the first user.

13. The method of claim 11, wherein the electronic message comprises a link pointed to the web application system that, when selected at a second user computing device, causes the second user computing device to launch a second user interface page described by the first web application document at a second instance of the web application executing at the second user computing device.

14. The method of claim 9, wherein the first action comprises modifying a second data object of the plurality of data objects.

15. The method of claim 9, wherein the web application system is further programmed to perform operations comprising:
- receiving, through the first user interface page, a data request;
- executing at the database a view query to return a plurality of data objects corresponding to the data request; and
- serving, to the first instance of the web application executing at the first user computing device, a second user interface page describing the plurality of data objects returned by the view query.

16. The method of claim 9, wherein the web application system is further programmed to perform operations comprising:
- receiving, from an administrator computing device, a request to modify the first web application document;
- determining that object data of the first web application document indicates that an administrative user of the administrator computing device is permitted to modify the first web application document; and
- modifying the first web application document in response to the request.

17. A non-transitory machine-readable medium comprising instructions thereon that, when executed by at least one processor, causes the at least one processor to perform operations comprising:
- receiving, from a first user computing device, a request for a web application;
- responsive to the request, sending web application code to the first user computing device, the web application code executable by a web browser of the first user computing device to implement a first instance of the web application at the user computing device;
- accessing a master web application document, the master web application document comprising home user interface data describing a home user interface page, the home user interface page comprising:
  - a first user interface element that, when selected, causes the first instance of the web application to be operated according to a first web application document; and
  - a second user interface element that, when selected, causes the first instance of the web application to be operated according to a second web application document;
- serving the home user interface data to the first instance of the web application at the user computing device;
- receiving from the first user computing device a selection of the first user interface element;
- responsive to the selection of the first user interface element, accessing the first web application document, the first web application document comprising:
  - object data describing at least a portion of a plurality of data objects stored at a database;
  - user interface data describing a first user interface page to display data object attributes; and
  - rule data describing at least one action to be performed by the at least one processor in response to a change in a first data object;
- serving the first user interface page to the first instance of the web application executing at a first user computing device, the first user interface page including first data object attributes of the first data object;

receiving, from the first instance of the web application and through the first user interface page, a change to the first data object;

determining that the rule data describes a first action to be executed in response to the change to the first data object; and executing the first action.

18. The medium of claim 17, wherein the operations further comprise:

providing to an administrator computing device a template web application document, the template web application document comprising template object data, template user interface data, and template rule data; and receiving from the administrator computing device the web application document, wherein the web application document is a modification of the template web application document.

19. The medium of claim 17, wherein the operations further comprise:

providing to an administrator computing device a template web application document, the template web application document comprising template object data, template user interface data, and template rule data; and receiving, from the administrator computing device, the first web application document, wherein the first web application document is a modification of the template web application document.

20. The medium of claim 17, wherein the first action comprises sending an electronic message indicating the change to the first data object to a first user.

* * * * *